United States Patent
McAlexander et al.

(10) Patent No.: US 6,744,791 B2
(45) Date of Patent: Jun. 1, 2004

(54) RARE EARTH-DOPED MEDIUM WITH PHOTOREFRACTIVE GRATING AS COMPACT LASER SOURCE

(75) Inventors: William Ian McAlexander, Redwood City, CA (US); Douglas M. Baney, Los Altos, CA (US); Mark Andrew Troll, Seattle, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/097,690

(22) Filed: Mar. 12, 2002

(65) Prior Publication Data

US 2003/0174742 A1 Sep. 18, 2003

(51) Int. Cl.[7] ................................................. H01S 3/10
(52) U.S. Cl. ............................. 372/20; 372/102; 359/15
(58) Field of Search ........................... 372/19, 20, 27, 372/102, 109; 359/3, 7, 11, 15, 34

(56) References Cited

U.S. PATENT DOCUMENTS

| | | | | |
|---|---|---|---|---|
| 5,335,098 A | * | 8/1994 | Leyva et al. | 359/7 |
| 5,491,570 A | * | 2/1996 | Rakuljic et al. | 359/7 |
| 5,640,256 A | * | 6/1997 | De Vre et al. | 359/3 |
| 5,665,493 A | * | 9/1997 | Bai et al. | 430/1 |
| 5,684,611 A | * | 11/1997 | Rakuljic et al. | 359/7 |
| 5,691,829 A | * | 11/1997 | Fischer et al. | 359/7 |
| 5,691,989 A | * | 11/1997 | Rakuljic et al. | 372/20 |
| 5,796,096 A | * | 8/1998 | Rakuljic et al. | 250/226 |
| 5,822,090 A | * | 10/1998 | Wilde | 359/7 |
| 5,875,053 A | * | 2/1999 | Webjorn et al. | 359/326 |
| 6,041,071 A | * | 3/2000 | Tayebati | 372/64 |
| 6,163,378 A | * | 12/2000 | Khoury | 356/457 |
| 6,363,097 B1 | * | 3/2002 | Linke et al. | 372/102 |
| 6,373,806 B1 | * | 4/2002 | Kitamura et al. | 369/103 |

OTHER PUBLICATIONS

Feuchter, T., et al., "Erbium–Doped Ion–Exhanged Waveguide Lasers in BK–7 Glass," IEEE Photonics Technology Letters, vol. 4, No. 6, 1041–1135/92, Jun. 1992.

Roman, J.E., et al., "Ion–exchanged Er/Yb waveguide laser at 1.5 um pumped by a laser diode."

Roman, J.E. et al., "Neodymium–doped glass channel waveguide laser containing an integrated distributed Bragg reflector," Appl. Phys. Lett. 61 (23), Dec. 1992, pp. 2744–2746.

Vossler, G.L., et al., "Planar Er:Yb glass ion exchanged waveguide laser," Electronics Letters, vol. 31, No. 14, Jul. 1995, pp. 1162–1163.

* cited by examiner

Primary Examiner—Kevin Pyo
Assistant Examiner—Davienne Monbleau

(57) ABSTRACT

A compact, broadband laser source is realized by using a rare earth dopant to define a laser gain spectrum and by using holographic imprinting techniques to form a wavelength selection element for selecting a particular wavelength from within the gain spectrum. Artificial broadening of the gain spectrum can be achieved by establishing varied (e.g., randomized) domains of space charge within a rare earth-doped laser gain medium. Compactness can be enhanced by fabricating the laser gain medium and wavelength selection elements within a single member, such as a photorefractive crystal substrate. Flexibility in the selection of a wavelength can be obtained by holographically imprinting multiple sets of wavelength selection elements.

9 Claims, 7 Drawing Sheets

RARE EARTH-DOPED MEDIUM WITH PHOTOREFRACTIVE GRATING AS COMPACT LASER SOURCE

TECHNICAL FIELD

The invention relates generally to laser sources and more particularly to techniques for defining a gain spectrum of available laser emissions and for wavelength tuning within the gain spectrum.

BACKGROUND ART

Optical communications and networking systems utilize tunable laser sources to produce laser emissions at selected wavelengths. Advantages of a tunable laser source include an increase in the flexibility of the system and an increase in the information-transfer capability of the system.

A tunable laser source includes a number of components. A conventional laser having a fixed wavelength emission may be used to generate a light beam which is pumped into a laser gain medium that enables broad spectral emission over a useful range of wavelengths. A wavelength-selection component (e.g., a tuning component) is employed to preferentially select a wavelength from the range for encoding and carrying information.

Operations for encoding a laser beam to carry information may take place at the beam-generating stage by the timing of a switching mechanism that activates and deactivates the pumping of laser light into the gain stage. However, the encoding operations typically occur after the wavelength-selection stage that follows the gain stage. Either arrangement operates well for its intended purposes. However, what is needed is a method and device for increasing the compactness of tuned laser sources. What is further needed is such a method and device for enabling a broadening of the gain spectrum in a cost efficient and reproducible manner.

SUMMARY OF THE INVENTION

A compact tunable laser source or tuned laser source is obtained by using rare earth doping techniques and holographic imprinting techniques to define a laser gain spectrum and to select a wavelength from within the gain spectrum. Broadening of the gain spectrum may be achieved by establishing varied domains of space charge within the rare earth-doped laser gain medium in which the gain spectrum is defined. Flexibility in the selection of a wavelength can be obtained by holographically imprinting multiple sets of wavelength selection elements within a single segment of the tunable laser source. Compactness can be enhanced by fabricating the doped laser gain medium and the tuning segment as a unitary member, such as by introducing a rare earth dopant and wavelength selection elements into a single substrate of photorefractive crystal.

The operations of the laser gain medium are triggered merely by introducing laser light into the medium to excite quantum states. As is well known in the art, the laser output of a tunable laser source is a function of the available specific energy gaps between higher and lower quantum states, which are based upon the nature of the gain medium. High gain and broad spectrums of useful wavelengths (e.g., wavelengths which are compatible with fiber optic communication systems) are desirable. The use of the rare earth dopant produces the desired wavelength band of emission. Acceptable dopants include one or more of Er, Yb and Nd.

As noted, one aspect of the invention is to provide artificial broadening of the gain spectrum by forming variations in the domains of space charge within the rare earth-doped gain medium. By forming the gain medium within photorefractive crystal, variations in domains of polarization can appear to be randomized merely by using laser writing during the fabrication process. Alternatively, randomized domains of polarizations can be achieved by thermally annealing the photorefractive crystal. As a third possibility, the introduction of impurities into rare earth-doped gain medium may provide the desired domain randomization. Thus, this spectrum broadening aspect of the invention is particularly well suited for use in the embodiment in which the laser gain medium and the wavelength selection elements are formed in a single photorefractive crystal.

Holographic gratings can be imprinted into the photorefractive crystal during fabrication of the tunable or tuned laser source. Multiple laser beams may be directed into the crystal at intersecting angles to form interference patterns. A high electric field is established within the crystal to alter the mobility of carriers, thereby allowing periodic polarization (or space charge) patterns to develop in accordance with the interference patterns of the laser fields. A number of different sets of holographic gratings may be formed within the photorefractive medium using this approach, with each set being specific to a different center wavelength within the gain spectrum of wavelengths. In one embodiment, each set of holographic gratings is tunable within a range about its center wavelength, but the sets may be fixed with respect to selecting their respective center wavelengths.

After the tuning elements have been holographically imprinted, a combination of electrical and thermal conditions determines the diffraction characteristics of a set of holographic gratings and/or determines which set of holographic gratings is activated. Typically, the temperature is stabilized, so that the sets of gratings are tuned by varying the electric field. Each set of gratings functions as a Bragg grating to preferentially pass or reflect light on the basis of wavelengths. In one embodiment, the Bragg gratings are designed to reflect only the desired wavelength of laser light, while the unselected wavelengths are passed. This is the preferred mode of operation for the case in which the gratings function as an output coupler. However, the opposite arrangement is also a possibility, since both preferential reflection gratings and preferential transmission gratings are known in the art.

An advantage of the invention is that a compact laser source is formed using techniques which are reliable and repeatable. The rare earth doping produces a gain spectrum which includes wavelengths used within the optical communications environment. A gain spectrum of wavelengths between 1300 nm and 1600 nm is preferred, with a range of 1530 nm to 1560 nm being most preferred. By incorporating a number of sets of holographic gratings within the same material that includes the region that is rare earth doped to define the laser gain medium, a flexibility in the selection of the frequency of the laser output is significantly increased.

DETAILED DESCRIPTION

Figure 1:
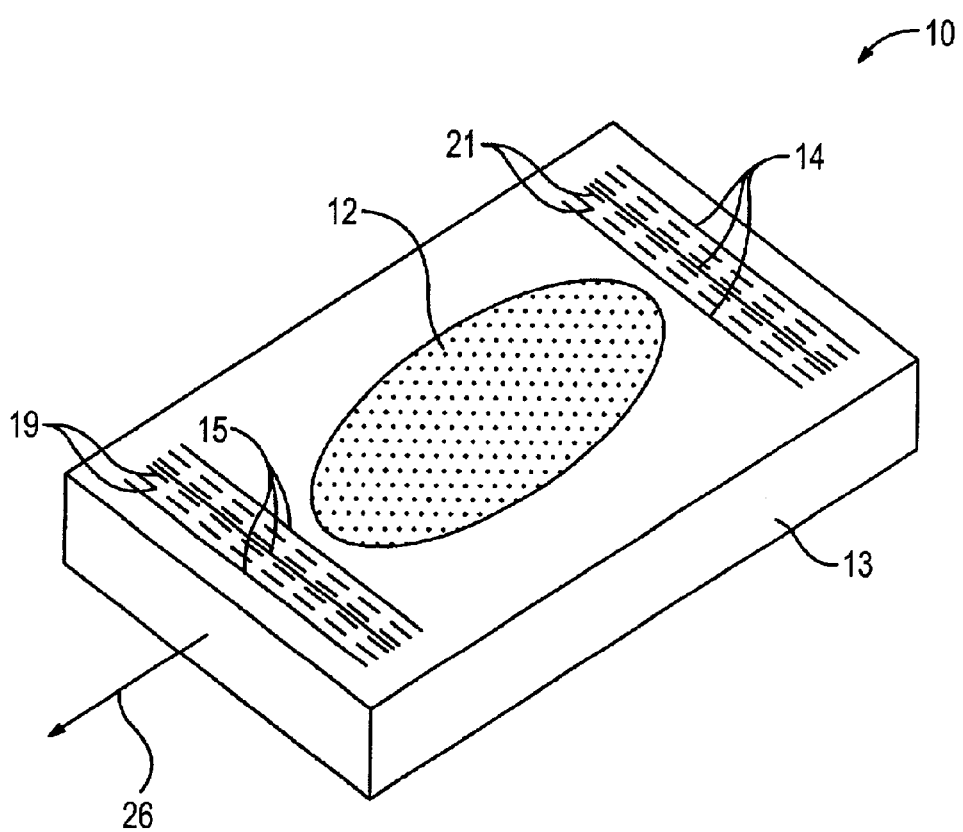
FIG. 1 is a perspective view of a unitary device for defining a laser gain spectrum and selecting a wavelength from within the spectrum, with the device being formed in accordance with one embodiment of the invention.

With reference to FIG. 1, a first embodiment of a device 10 for use in a laser source is shown as being a unitary member having a region 12 that is doped to form a laser gain medium between two sets 14 and 15 of holographic gratings that may be identically tuned to function as mirrors for light having a particular wavelength. Alternatively, the device may have a single set of holographic gratings or may have more than two sets. Dashed lines 19 and 21 represent third and fourth sets of holographic gratings which either are tunable within a different wavelength range than the first and second sets 14 and 15 or are selectively activated and deactivated with respect to acting upon light having a particular frequency different than that of light acted upon by sets 14 and 15. That is, grating sets 14 and 15 may be specific to one wavelength range or one fixed wavelength, while grating sets 19 and 21 are specific to a different wavelength range or a different fixed wavelength, with the sets being separately activated and deactivated. Thus, for a telecommunications system that employs ten standardized wavelengths, the tunable laser source may have ten sets of gratings on each side of the doped region, rather than having gratings that are tuned within a wavelength range that includes the ten wavelengths.

The unitary member may be a substrate 13 of photorefractive material, such as Potassium Tantalate Niobate (KTN) or Potassium Lithium Tantalate Niobate (KLTN). As will be explained more fully below, the doped region 12 of the substrate 13 includes at least one rare earth element, so as to define a desired laser gain spectrum, such as a spectrum from 1300 nm to 1600 nm. The holographic gratings 14 and 15 have center wavelengths within the gain spectrum, so that the available wavelengths may be preferentially selected in generating a laser output 26.

Figure 2:
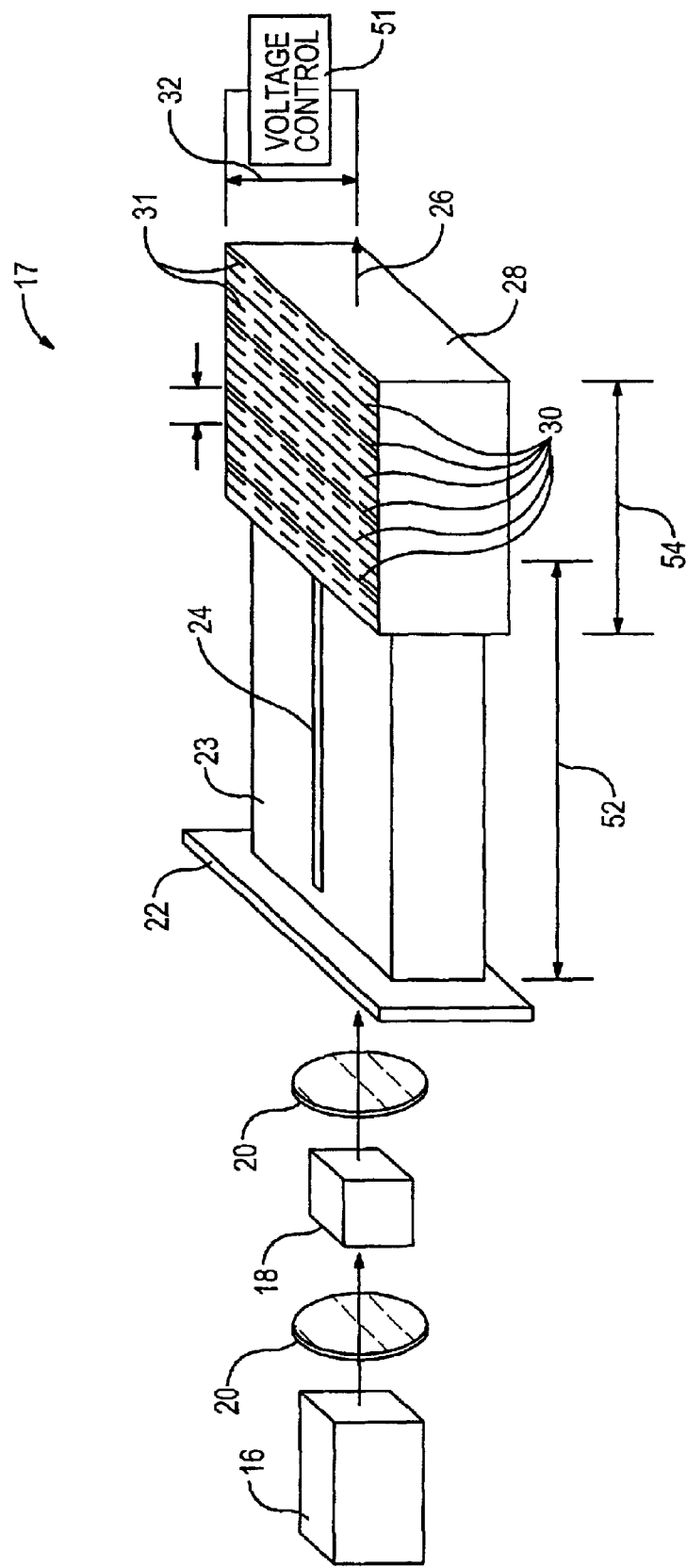
FIG. 2 is a detailed perspective view of a laser source in accordance with a second embodiment of the invention.

FIG. 2 illustrates a second embodiment of the invention, along with other components for use with the invention. A tunable laser source 17, such as a solid state waveguide laser, is shown as including a laser pump 16. As one example, the laser pump may be a source of coherent light having a wavelength of 980 nm. While not shown in FIG. 2, the tunable laser source may have more than one laser pump. The output of the laser pump 16 may be manipulated by one or more isolators 18 and may be focused by one or more lenses 20.

Laser pump energy is directed by the lenses 20 through a dielectric mirror 22. The dielectric mirror may be formed using any of the methods known in the art. For example, the dielectric mirror may be evaporated directly onto a first polished end of a waveguide substrate 23. Alternatively, the dielectric mirror may be coupled to the first waveguide end using an index-matching epoxy, such as an optical grade epoxy. The dielectric mirror allows entrance of energy at the wavelength of the coherent light from the laser pump 16, but has a high reflectivity at the wavelength of the laser output 26. For example, if the selected wavelength for laser output 26 is 1550 nm, the dielectric mirror may have a reflectivity of 99% at 1550 nm.

In the embodiment of FIG. 2, a wavelength selection segment 28 is formed separately from the waveguide substrate 23, rather than being a one-piece structure as shown in FIG. 1. In both of the embodiments of FIG. 1 and FIG. 2, the target gain spectrum is achieved by using at least one rare earth element. An acceptable fabrication approach for forming an ion channel 24 in an $Er_2O_3$-doped waveguide substrate is described by Feuchter et al. in a publication entitled, "Erbium-Doped Ion Exchanged Waveguide Lasers in BK-7 Glass," *IEEE Photonics Technology Letters*, Volume 4, No. 6, June 1992. The fabrication approach will be described in greater detail below, but briefly, a substrate of BK-7 glass having a bulk dopant of rare earth material is modified to embed a metal/ion channel into the substrate. For example, an embedded ion/metal channel may be formed to provide index guiding along a fully doped substrate by (1) vacuum evaporating a film of metal onto the substrate, (2) photo-lithographically opening a straight channel (or more than one channel) through the metal film and (3) immersing the substrate in molten $KNO_3$ at 395° C. for eleven hours. As a result, an ion channel having a width of 5 $\mu$m to 7 $\mu$m may be formed along a BK-7 glass substrate that was previously doped with 1% $Er_2O_3$. Optionally, 5% $Yb_2O_3$ may be added as part of the rare earth doping process in order to achieve increased efficiency.

The wavelength selection segment 28 is formed of a photorefractive material, such as KTN or KLTN photorefractive crystal. The segment 28 includes at least one set of wavelength selection elements 30 that are holographically imprinted. In the same manner as the embodiment of FIG. 1, the segment may include a number of different sets of wavelength selection elements to increase the wavelength variability at the output 26. An additional set of holographic gratings is represented by the dashed lines 31. For embodiments in which the tunable laser source 17 is temperature stabilized, a voltage 32 is used to activate a target tuning element. The voltage is applied across the photorefractive wavelength selection segment 28 during operation of the tunable laser source 17. As will be explained more fully below, an applied field is also used during the fabrication procedure to imprint a space charge structure of the tuning element. It should be noted that the wavelength of emission can also be controlled by changing the temperature of the wavelength selection segment 28.

In the embodiment in which the wavelength selection element 30 is a reflection grating (as compared to a transmission grating, for example), a target wavelength is selected by the reflection grating and fed back into the gain medium of the waveguide substrate 23 to preferentially enhance emission of the target wavelength. The energy that is leaked/transmitted at the target wavelength forms the laser output. While the preferred embodiment is one in which reflection gratings are used, other embodiments may be substituted.

Returning to the embodiment of FIG. 1, the device 10 has a waveguide channel that is electro-optically responsive. That is, variations of the electro-optic effect (e.g., using an applied voltage) could be used to switch the laser "on" and "off," as well as to alter its gain and lasing characteristics. Sets of holographic gratings 14 and 15 are shown on opposite sides of the rare earth-doped region 12, but a single set of gratings may be utilized. The grating spacing will depend upon the device and the target wavelength, but typically spacing is within the range of 10 nm to 500 nm.

Figure 3:
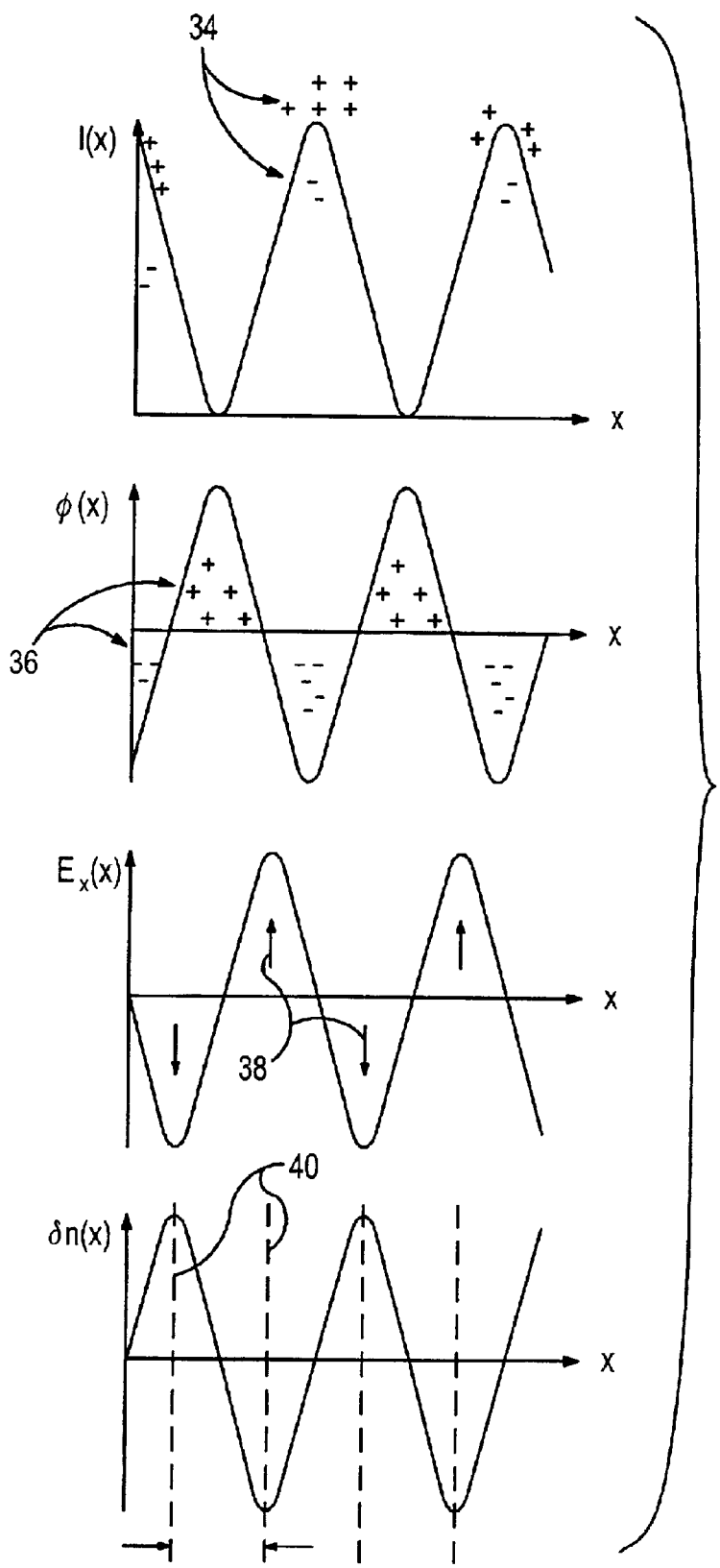
FIG. 3 is a series of graphs illustrating the movement of space charge distribution within a photorefractive material of the device of FIG. 1.
Figure 4:
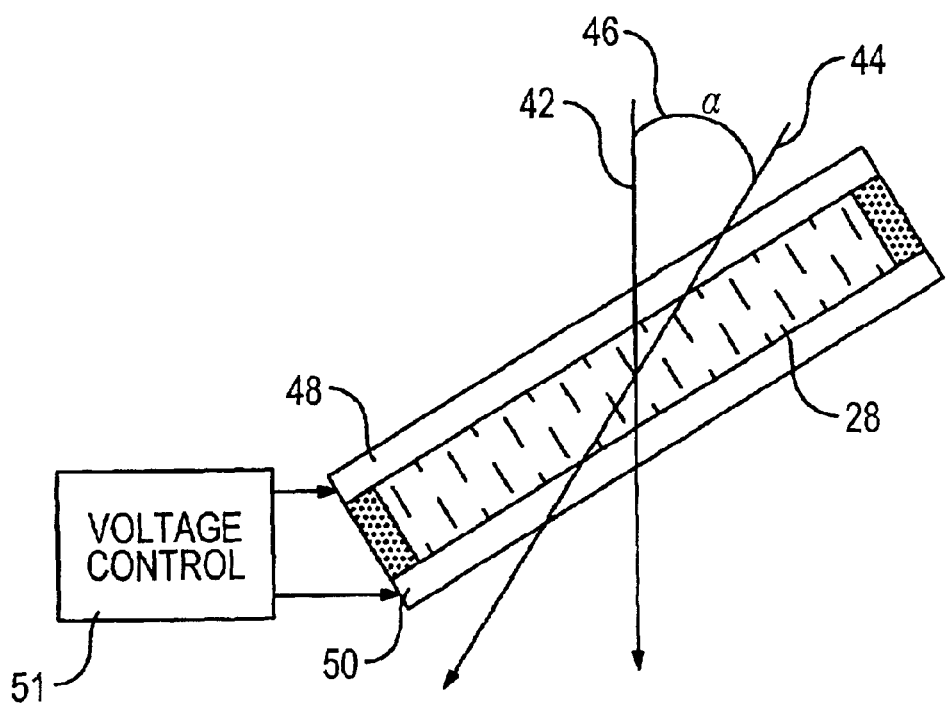
FIG. 4 is a side view illustrating the conditions for imprinting holographic gratings using two lasers and an applied voltage.

FIG. 3 illustrates the formation of photorefractive phase gratings, while FIG. 4 represents the conditions for the photorefractive imprinting process. In FIG. 4, a pair of laser beams 42 and 44 pass through a photorefractive material, such as $KTa_{1-x}Nb_xO_3$ or $K_{1-x}Li_xTa_{1-y}Nb_yO_3$:Cu, V. The laser beams are directed to intersect at an angle 46 that achieves a desired interference pattern within the photorefractive wavelength selection segment 28. The photorefractive wavelength selection segment is captured between a pair of electrodes 48 and 50 that are connected to a voltage control device 51 to allow a potential difference to be formed across the segment. The photorefractive effect arises when charge carriers 34, as shown in the first graph of FIG. 3, are photo-generated in a pattern that reflects the interference pattern of the two beams 42 and 44. The charge carriers separate by drift and diffusion, but become trapped when the applied imprinting voltage is terminated. This produces a non-uniform space-charge distribution 36 shown in the second graph of FIG. 3. The resulting space-charge distribution induces localized space-charge electric fields 38, as represented in the third graph of FIG. 3. The localized space-charge electric fields modulate the refractive index of the wavelength selection segment 28 to create a tuning element. This is represented by the space-charge field grating 40 of the last graph of FIG. 3.

After the imprinting of the wavelength selection elements, the applied electrical field from the voltage control device 51 of FIGS. 2 and 4 may be used to achieve wavelength selectivity. Thus, the wavelength selection elements 30 are used to allow only selected wavelengths to propagate in a manner which produces the laser output 26. Typically, temperature stabilization is provided, so that only the strength or the position of the applied electric field is varied to change the wavelength selectivity. Temperature stabilization should be held to within 0.1° Celsius. Temperature stabilization may be obtained by use of a temperature-controlled block or a thermoelectric cooler with a thermistor device, but other techniques may be substituted.

In the para-electric region of operation, the photorefractive wavelength selection segment 28 exhibits a quadratic electro-optic effect that is given by Eq. 1.

$$\Delta n = \frac{1}{2} n_o^3 g P^2 \qquad \text{Eq. 1}$$

where $\Delta n$ is the birefringence of the crystal, $n_o$ is the refractive index, $g$ is the appropriate electro-optic coefficient and $P$ is the polarization of the crystal, which is proportional to the applied electric field. Varying the applied electrical field to a single set of gratings may change the frequency by as much as 100 GHz in some applications.

As previously noted, there may be more than one set of holographic gratings. The gratings may be spatially overlapped as shown within the photorefractive substrate 13 of FIG. 1 or the wavelength selection element 28 of FIG. 2, but an increase in overlapping gratings reduces the efficiency of the device. Therefore, the gratings are preferably spatially separated in order to improve performance.

In operation, the effective holographic grating spacing can be changed by varying the applied electric field, so as to induce changes in the refractive index of the photorefractive crystal. The variation in index for the grating is given by:

$$\delta n = n_o^3 g \epsilon_o^2 (\epsilon - 1)^2 E_{sc} E_o \qquad \text{Eq. 2}$$

where $\delta n$ is the grating depth, $\epsilon_o$ and $\epsilon$ are the pertinent dielectric constraints and $E_{sc}$ and $E_o$ are the space charge and the applied electric fields, respectively. This equation is relevant both during the holographic imprinting process and during the use of the fabricated device.

A typical range for the applied electric field used to activate the photorefractive tuning elements may be 40 volts/cm to 4,000 volts/cm. The preferred electric field depends upon the properties and dimensions of the laser tunable device.

Regarding the fabrication of the waveguide substrate 23 in the embodiment of FIG. 2, the waveguide substrate may be Er-doped BK-7 glass which has a potassium ion-exchanged channel 24 embedded using techniques known in the art and briefly explained. In one embodiment, the potassium ion-exchanged planar waveguide laser to be fabricated is one that operates in the waveband of approximately 1540 nm, and its fabrication process begins with doping BK-7 glass with 0.5% per weight $Er_2O_3$. The substrate material is prepared by mixing small pieces of glass with the $Er_2O_3$ dopant in a platinum crucible placed in an electric furnace at a temperature varied between 850 and 1450° Celsius. The melt is mixed to maintain a uniform distribution of the $Er_2O_3$ ions in the host. The glass is removed from the furnace at 1300° Celsius, cast into a stainless steel mold, and annealed at 580° Celsius. The substrate is then allowed to cool at room temperature.

The glass can be sliced to the desired dimensions. At least one side is polished to achieve electronic quality. A masking layer, such as a 250 nm thick aluminum film, is deposited on the surface using vacuum evaporation or other techniques known in the art. Standard positive photolithography may be used to expose one or more channels. The width of the channel in the aluminum mask may be in the range of 5 μm to 7 μm. A waveguide can then be fabricated through ion exchange by immersing the substrate with the exposed channels in molten $KNO_3$ at 395° Celsius for eleven hours. These conditions can be used to produce one or more waveguides, each supporting a single transverse mode transmission of approximately 1540 nm. The ends of the substrate perpendicular to the channel 24 are polished. The length 52 of the waveguide substrate 23 of FIG. 2 may be 2 cm, with the length 54 of the wavelength selection segment 28 being approximately 1 cm. However, waveguide substrates having a length of approximately 36 mm are contemplated.

At a first polished end of the waveguide substrate 23, the dielectric mirror 22 is bonded, such as by using an ultraviolet-curing epoxy. Similarly, epoxy can be used to attach the wavelength selection segment 28 to the waveguide substrate 23.

Figure 5:
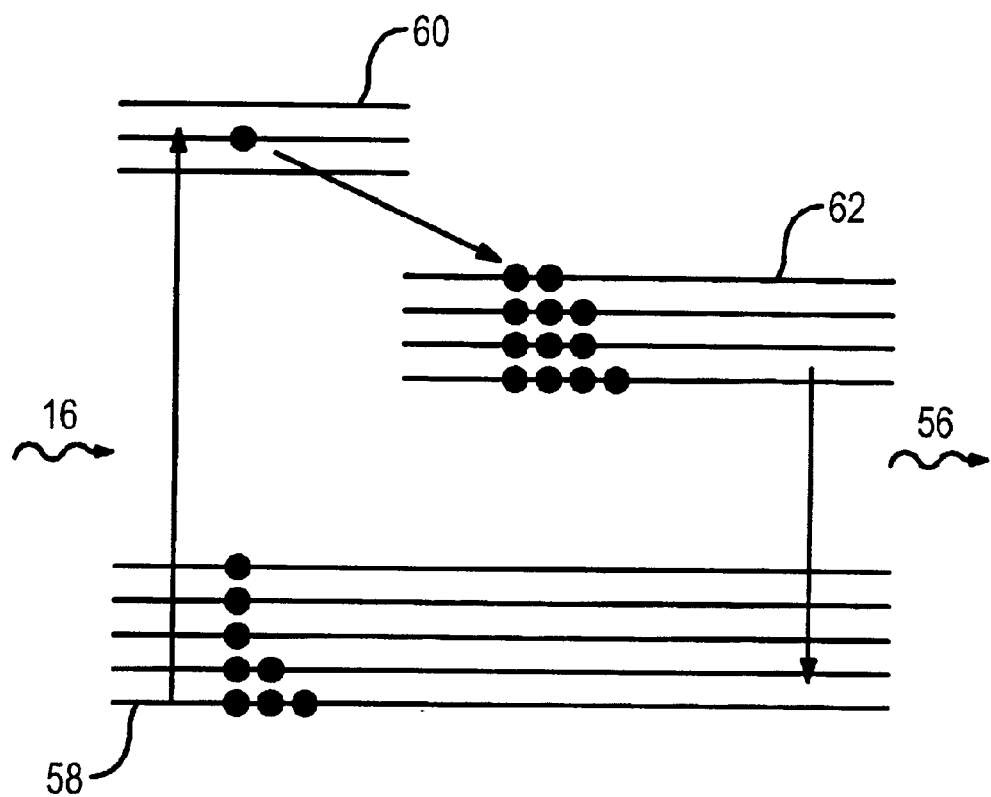
FIG. 5 is a schematic illustration of the energy levels for an Erbium-doped laser source for use in FIG. 1 or 2.
Figure 6:
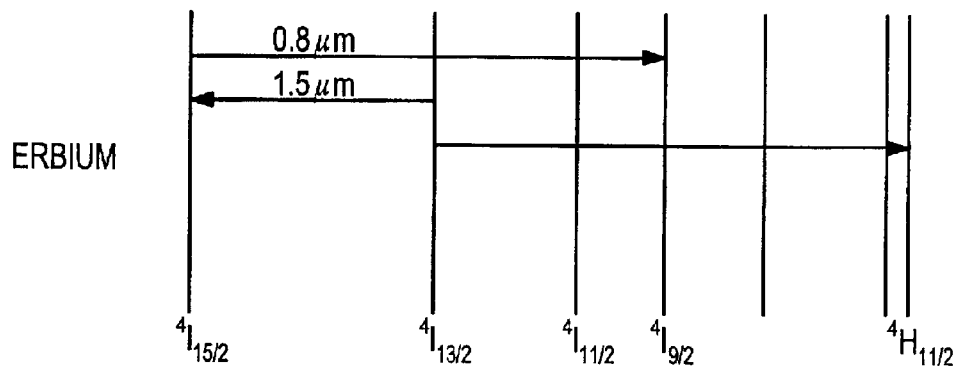
FIG. 6 is an illustration of the energy band gaps for absorption and emission of the Erbium-doped laser source of FIG. 5.

A particularly useful frequency for use in optical telecommunications is 1550 nm. FIG. 5 illustrates the energy levels of an Erbium-doped laser source having a useful output energy 56 in the 1530 nm to 1560 nm waveband. Referring to FIGS. 2 and 5, the laser pump 16 is used to create an excited state in the doped laser gain medium within the waveguide substrate 23. FIG. 5 schematically represents operations in which the Erbium is excited by the incoming light to progress from a low level state 58 to a high level state 60. Rapid decay then results in a drop to an intermediate excited state 62 and a population inversion is created, as understood by persons skilled in the art. The outgoing energy 56 is generated by stimulated emission from the drop from the intermediate excited state 62 to the low level state 58. FIG. 6 illustrates the energy band gaps for absorption and emission in an Erbium-doped laser source.

Figure 7:
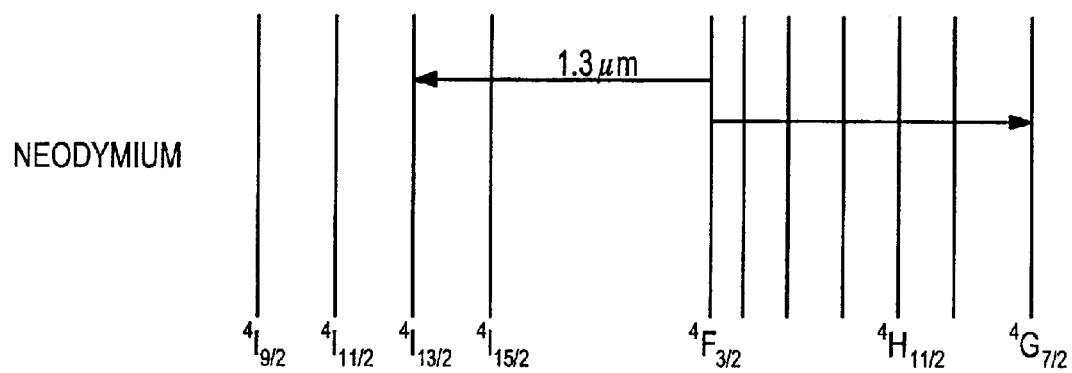
FIG. 7 is an illustration of the energy band gaps for absorption and emission in a Neodymium-doped laser source for use in FIGS. 1 and 2.

Optionally, a Neodymium-doped laser source may be used. FIG. 7 illustrates the energy band gaps for absorption and emission in such a laser source. Neodymium has a characteristic energy band gap in the region of 1300 nm, and can be a useful dopant for a laser gain medium having a target wavelength of 1300 nm. Other elements and compounds can similarly be used as gain medium dopants to produce desired wavebands of laser emissions, where the wavebands are characteristic of energy band gaps for the particular elements or compounds.

Figure 8:
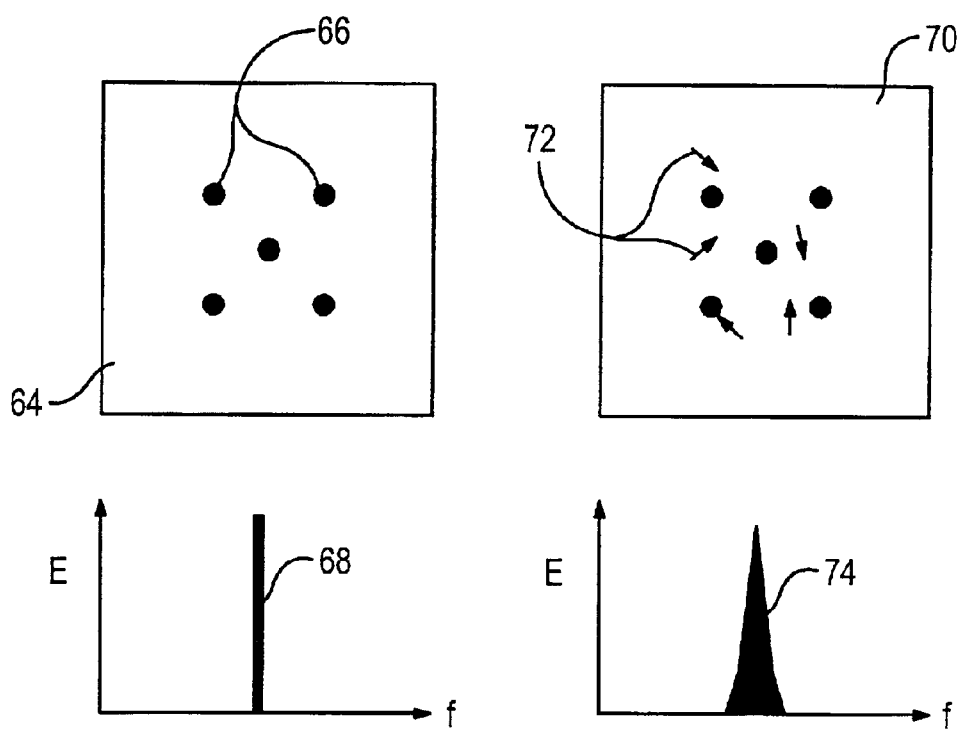
FIG. 8 includes illustrations of the broadening of a gain of a laser source as a result of randomized domains of polarization within the photorefractive material of FIG. 1.

Since it is desirable to enable emissions from a wide gain spectrum, another aspect of the invention is to artificially broaden the laser emission waveband. In one embodiment, artificial broadening is accomplished by utilizing the photorefractive properties of the laser gain medium within the doped region 12 of FIG. 1. Specifically, random domains of space charge are established within the doped region. FIG. 8 illustrates the artificial broadening. When a laser gain medium 64 includes dopants 66, but does not include the randomized space charge, its frequency spectrum 68 is narrow. However, a similarly rare earth-doped laser gain medium 70 having varying polarized domains 72 exhibits a frequency spectrum 74 that is significantly broader.

As one possibility, the variations in the polarization domains 72 may be accomplished using a laser imprinting procedure that is similar in concept to the laser imprinting of the gratings described above. Using laser imprinting, the varying domains appear to be randomized. As another possibility, the photorefractive crystal may be annealed to thermally establish the randomization of polarization domains. A third possibility is to intentionally introduce impurities into the process of doping the substrate with the rare earth material.

What is claimed is:

1. A method of producing laser emissions of a selected wavelength comprising the steps of:

directing light into a laser gain medium that includes a rare earth element that defines a gain spectrum of wavelengths and includes intentionally varied domains of space charge to broaden said gain spectrum of wavelengths, said laser gain medium being operable within a laser source; and manipulating said light by use of a photorefractive wavelength selection element which is holographically imprinted within a photorefractive segment of said laser source, thereby selecting a target wavelength from within said gain spectrum.

2. The method of claim 1 wherein said directing said light includes introducing laser light into a single-piece of photorefractive crystal that is doped to form said laser gain medium and that is holographically imprinted to form said photorefractive wavelength selection element.

3. The method of claim 1 wherein said directing of light includes introducing laser, light into said laser gain medium as a separate physical component relative to said photorefractive segment of said laser source.

4. The method of claim 1 wherein said manipulating includes electrically activating a particular set of holographically imprinted diffraction gratings while leaving other sets of holographically imprinted diffraction gratings substantially inactive, each said set being specific to a target center wavelength in said gain spectrum of wavelengths.

5. A laser emission device comprising:

photorefractive crystal having holographically imprinted gratings which are responsive to applied electric fields to enable propagation of laser energy having a selected wavelength within a gain spectrum; and a gain region having a rare earth dopant selected to define said gain spectrum and including intentionally varied domains of space charge to broaden said gain spectrum, said gain region and said tuning gratings being cooperative to determine properties of a laser output.

6. The device of claim 5 wherein said gain region is formed in said photorefractive crystal, thereby providing a unitary wavelength selection laser.

7. The device of claim 5 wherein said rare earth dopant includes at least one Er, Yb and Nd.

8. The device of claim 5 wherein said tuning gratings are sets of diffraction gratings, each said set being configured to reflect a specific selected wavelength of laser light.

9. The device of claim 5 wherein said intentionally varied domains of space charge comprise a randomized arrangement of domains of space charge.

* * * * *